United States Patent [19]

Willes

[11] Patent Number: 5,471,788
[45] Date of Patent: Dec. 5, 1995

[54] METHOD AND APPARATUS FOR TRANSPLANTING PLANT MATERIAL

[75] Inventor: John A. Willes, West Chicago, Ill.

[73] Assignee: Wonder Web Inc., West Chicago, Ill.

[21] Appl. No.: 180,711

[22] Filed: Jan. 12, 1994

[51] Int. Cl.⁶ .................................................. A01G 23/02
[52] U.S. Cl. ....................................................... 47/75; 47/73
[58] Field of Search ............................ 47/75 N, 76 WB, 47/79 N, 75 N, 73 R

[56] References Cited

U.S. PATENT DOCUMENTS

| | | | |
|---|---|---|---|
| 923,663 | 6/1909 | Kroeger | 47/75 N |
| 3,781,183 | 12/1973 | Doll | 47/76 WB |
| 4,100,699 | 7/1978 | Skaife | 47/75 N |
| 4,142,324 | 3/1979 | Magyar | 47/75 N |
| 4,223,480 | 9/1980 | Welty | 47/75 N |
| 4,604,825 | 8/1986 | Mainprice | 47/76 WB |

FOREIGN PATENT DOCUMENTS

| | | | |
|---|---|---|---|
| 1482977 | 6/1969 | Germany | 47/75 N |
| 2004006 | 5/1983 | Germany | 47/75 N |
| 255727 | 11/1927 | Italy | 47/75 N |
| 299 | 1/1885 | United Kingdom | 47/73 R |

*Primary Examiner*—Henry E. Raduazo
*Attorney, Agent, or Firm*—Patnaude, Videbeck and Marsh

[57] ABSTRACT

A liner for a planting pot has a generally tubular body with an upper open end and a lower end with a transverse floor. The body has a plurality of openings in the wall thereof. When plant material is planted in a pot having such a liner, the plant material may be transplanted to a larger pot by removing the liner and plant material from the first pot and planting it in a second, larger pot.

1 Claim, 2 Drawing Sheets

1

METHOD AND APPARATUS FOR TRANSPLANTING PLANT MATERIAL

The present invention relates to a liner to fit in a planting pot to assist in the planting and replanting of potted plant material.

BACKGROUND OF THE INVENTION

Generally, a decorative plant is first planted in a small pot, and after outgrowing the first pot, is transplanted to a larger pot. During its life a plant may undergo numerous transplanting as it grows in size. Plant material may also be transplanted to place it into a more attractive pot or to make an attractive assembly or reassembly of plant material.

To remove plant material from a small pot, the pot may be inverted and the outer surface of the pot shaken or tapped until the plant material and surrounding soil fall from the inverted pot. If, however, the plant material has out grown a container which is too large to be inverted, removal of the plant material may require either breaking the container or using a shovel, or other tool, to dig the root structure from the soil in which it is embedded. Regardless of the method used, removing the plant material from one pot to transplant it into a larger pot generally results in loss of soil surrounding the roots and damage to the plant.

It would, therefore, be desirable to provide a method and apparatus for transplanting plant material while retaining in place the existing soil and root structure of the plant.

SUMMARY OF THE PRESENT INVENTION

Briefly the present invention includes a basket or liner adapted to fit within a planting container for receiving plant material. The liner in accordance with the present invention has a generally tubular porus body with an open upper end and a transverse floor against the lower end of the body. The body has a plurality of openings in the walls through which roots of the plant material can grow.

In the preferred embodiment the tubular body is tapered or frustoconical narrowing at the bottom and has parallel strands of plastic material arranged in an intersecting pattern to form parallelogram openings therebetween. In the preferred embodiment the transverse floor of the liner is also made of parallel strands of plastic material arranged in an intersecting pattern to form parallelogram openings therebetween.

The body of each liner has dimensions which are a little smaller then the dimensions of a potting plant into which the liner is adapted to be nested. A pair of elongate openings positioned in opposite sides of the body near the upper rim of the liner provide handles for grasping the liner and removing it and any plant material and soil therein from the pot in which it is nested.

In accordance with the present invention, a plurality of liner sizes are provided each of which has a height and cross-sectional diameter which are not greater than the corresponding height and cross-sectional diameter of a plurality of pots each of a different size. Each size liner may therefore be positioned within a correspondingly sized pot prior to the planting of material therein.

Where plant material is growing within a pot having a liner in accordance with the present invention, the plant material may be removed from the pot by grasping the rim of the liner at the opposing elongate openings and pulling the liner and plant material therein upwardly out of the pot.

Thereafter the entire liner may be repositioned into a larger pot with a liner in accordance with the present invention, and soil added between the liners. Each transplanting of material to a larger pot would thereby result in the addition of a larger liner surrounding the roots of the plant.

GENERAL DESCRIPTION OF THE DRAWINGS

A better understanding of the present invention can be had from a review from the following detailed description taken in conjunction with the accompanying drawings wherein.

DETAILED DESCRIPTION OF THE PRESENT INVENTION

Figure 1:
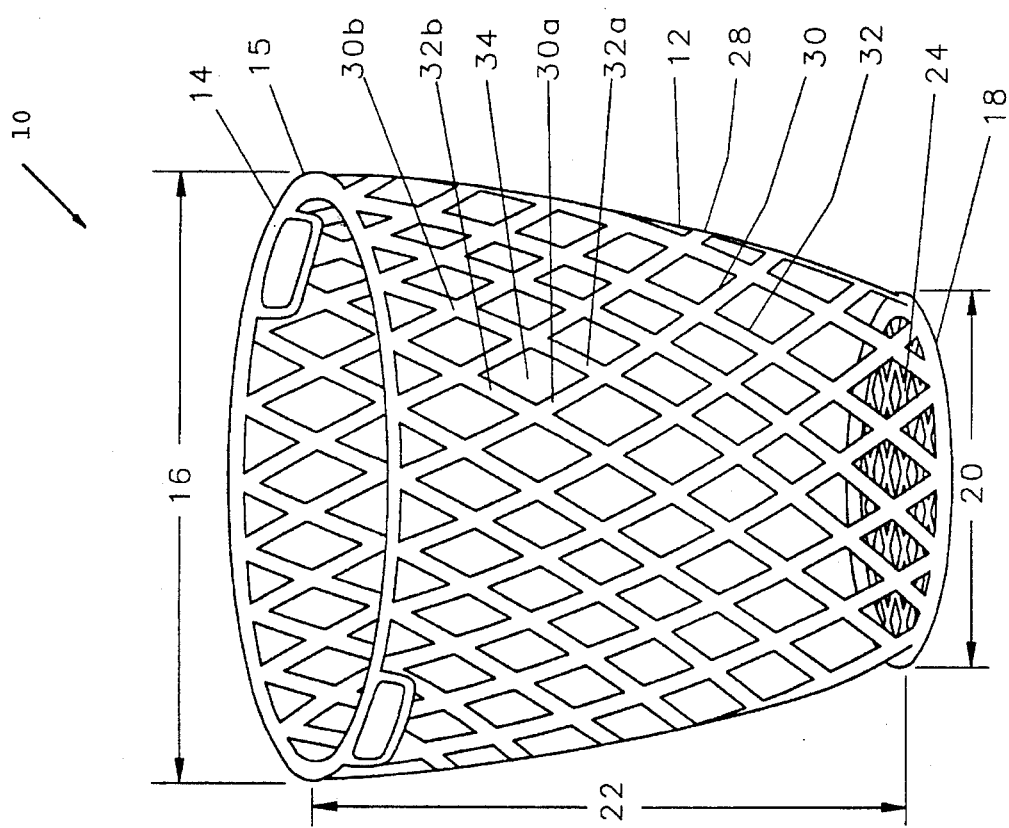
FIG. 1 is an isometric view of a liner in accordance with the present invention.

Referring to FIG. 1 a pot liner 10 in accordance with the present invention has a generally tubular body 12 with an upper open end 14 bordered by a rim 15, having a first given diameter 16 and a lower end 18 having a second diameter 20 which is typically less than the first diameter 16. The body 12 also has a height 22 and across the lower end 18 is a transverse floor 24.

In the preferred embodiment, the liner 10 is made of a suitable non- biodegradable material such as polypropylene plastic which will not decay and contaminate soil. The walls 28 of the liner 10 are configured to have a first plurality of substantially parallel strands 30 which in FIG. 1 are depicted as spiralling upward in a clockwise direction when viewed from the top, and a second plurality of strands 32 which are depicted as spiralling upward in a counterclockwise direction. The strands 30, 32 have a sufficiently large cross sectional diameters such that the liner 10 will bear the weight of plant material and soil placed therein. As can be seen, the substantially parallel first strands 30a, 30b intersects the substantially parallel second strands 32a, 32b, to form parallelogram openings 34 in the walls 28. Near the upper rim 15 of the liner 10 are a pair of diametrically opposing horizontally oriented rectangular openings 36, 38 in the walls 28 thereof which are sized to receive several fingers of the human hand and serve as handles for holding the liner 10 and its contents. The bottom 24 of the liner 10 is formed of the same material as are the walls 28 and in the preferred embodiment, is also configured as parallel strands of material intersecting to form a grid of parallelograms similar to those in the walls 28. A liner in accordance with the present invention is best formed by injection molding.

Figure 3:
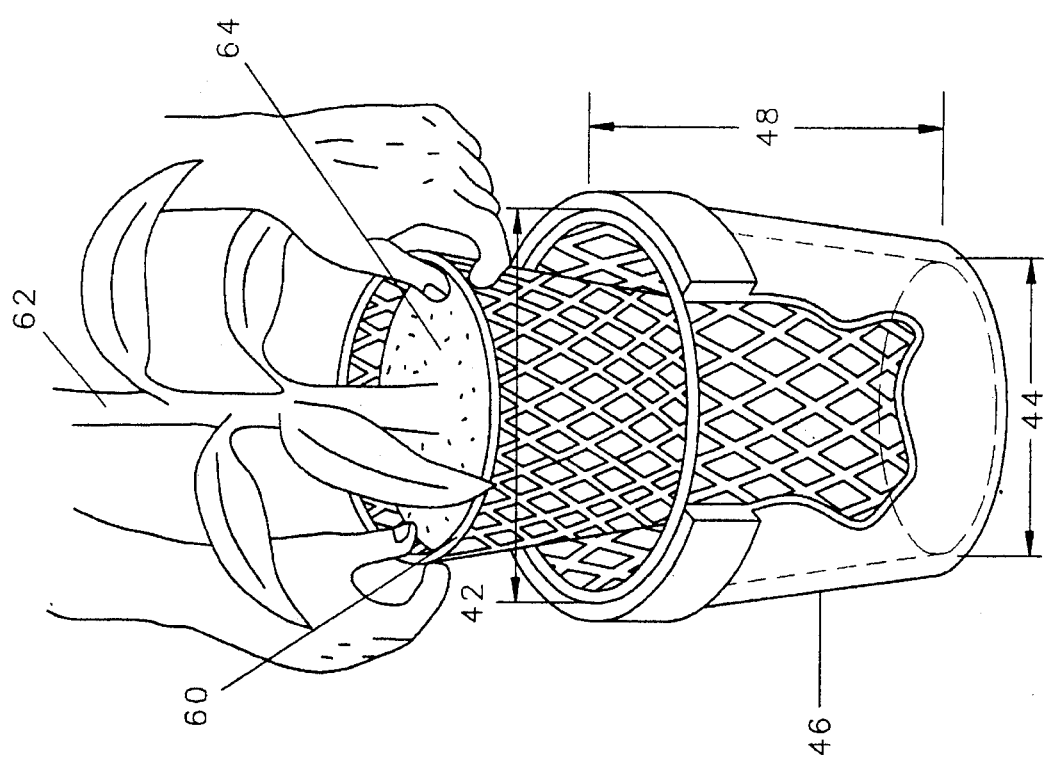
FIG. 3 is an isometric drawing of a pot with a first and second liner fitted therein, and a portion of the pot broken away to see the liner within.

Referring to FIG. 3, a liner 40 in accordance with the present invention has upper and lower outer diameters which are a little smaller than the corresponding inner diameters 42, 44 respectively of a typical planting pot 46 and the height of the liner 40 is a little shorter than the corresponding height 48 of the planting pot 46 such that the liner 40 will fit snugly within the pot 46.

Figure 2:
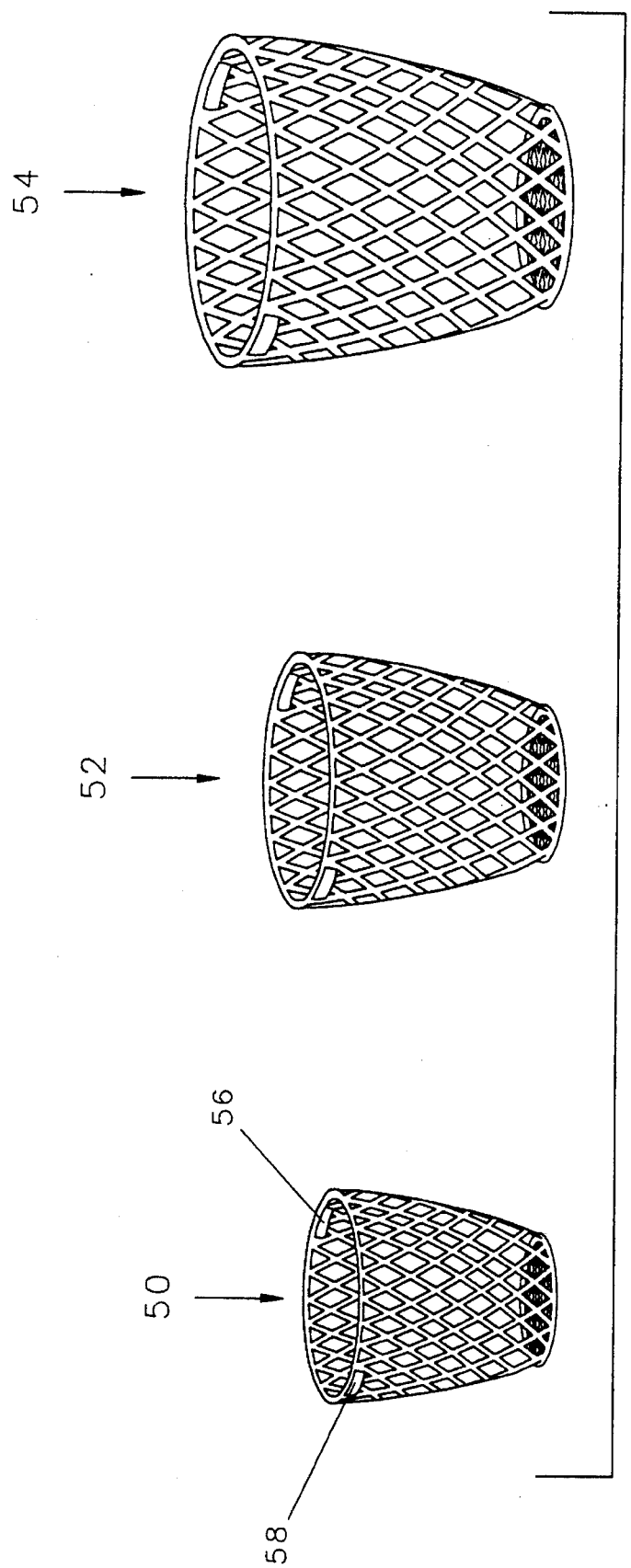
FIG. 2 is an isometric drawing of a plurality of liners in accordance with the present invention of varying sizes suitable for nesting one within another.

As shown in FIG. 2, in accordance with the present invention, liners 50, 52, 54 are provided in a variety of sizes and each liner 50, 52, 54 is adapted to fit within a different sized planting pot in the same manner that liner 40 is adapted to fit within pot 46. As a result, plant material which is planted within a pot having a small liner 50 may be removed from the pot into which it is fitted by grasping the handles 56, 58 thereof and fitting the entire liner 50, with the plant material and soil therein into a larger pot having a correspondingly larger liner 52. Later, that plant material can be transplanted again by removing the second liner 52, with the plant material and the first liner 50 therein and fitting the second liner 52 within a third pot with a corresponding larger liner 54 therein.

As shown in FIG. 3, a liner 60 with plant material 62 and surrounding soil 64 therein can be fitted within pot 46 having the somewhat larger liner 40 without causing disturbance to the soil 64 and the root structure of the plant 62. Once the smaller liner 60 is fitted within the larger liner 40, additional potting soil can be compressed between the sides of the inner and outer liners 60, 40 thereby completing the transplanting of the plant material 62.

Liners in accordance with the present invention may vary widely in sizes, however one size of a typical pot has a upper cross-sectional diameter of about 4 inches and a lower cross-sectional diameter of about 3 inches and a height of 4 inches. A liner in accordance with the present invention adapted to fit within such a pot has strands 30, 32 with cross-sectional diameters of approximately one tenth inch which form parallelogram openings having sides of from three fourth inch to one and one fourth inch. It will be appreciated that the parallelogram openings 34 will be sufficiently large to permit the root structure of plant material 62 growing within an inner liner 60 to expand through the openings 34 of the walls 28 of the inner liner and thereby not inhibit the growth of the plant material 62. The sides of the parallelogram openings 34 should also be sufficiently small to retain the soil surrounding the root structure during the transplanting procedure. Accordingly, plant material 62 may be first planted into a pot with a relatively small cross-sectional diameter and receiving a small liner and thereafter be planted into a larger pot suitable for receiving the larger liner as has been described wit respect to FIG. 2. The plant material 62 may therefore be successfully retransplanted as the material grows to larger and larger pots without damage to the root structure, and at all times permitting the root structure to expand into a larger pot.

While several preferred embodiments to the present invention have been disclosed, it will be apparent to those skilled in the art that many changes and modifications may be made without departing from the true spirit and scope of the present invention. It is therefore the purpose of the appended claims to cover all such changes and modifications that fall within the true spirit and scope of the invention.

I claim:

1. A kit for growing an item of plant material during its growth from a relatively small size to a substantially larger size, said kit comprising in combination:

a first liner having a generally tubular body with a first open upper end having a first upper outer diameter and a lower end having a first lower outer diameter, said first lower diameter not greater than said first upper diameter, said body of said first liner having a continuous wall with a plurality of openings therein, said openings being sufficiently large for plant roots to grow therethrough, a first pot having a unitary generally tubular wall with an open upper end having a first upper inner diameter and a first lower inner diameter, said tubular wall of said first pot being without openings penetrating said tubular wall thereof, said first upper inner diameter and said first lower inner diameter of said first pot sized for snugly receiving said first liner, and said first liner and said first pot sized to receive an item of plant material of a relatively small size planted therein, a second liner having a generally tubular body with a second open upper end with a second upper outer diameter and a second lower end with a second lower outer diameter, said second liner having a continuous wall with a plurality of openings therein, said openings being sufficiently large for plant roots to grow therethrough, a second pot having a unitary generally tubular wall with an open upper end having a second upper inner diameter and a second lower inner diameter, said tubular wall of said second pot being without openings penetrating said tubular wall thereof, said second upper inner diameter and said second lower inner diameter of said second pot sized for snugly receiving said second liner, said second upper diameters of said second liner and said second pot respectively greater than said first upper diameters of said first liner and said first pot respectively and said second lower diameters of said second liner and said second pot respectively greater than said first lower diameters of said first liner and said first pot respectively, said second pot and said second liner adapted to receive said first liner planted therein, wherein said first liner has an item of plant material planted therein which has grown to a substantially larger size, for further growing said plant material with the roots of said plant material growing through said plurality of openings in said walls of said first liner and within said second liner.

* * * * *